United States Patent [19]

Koseki et al.

[11] Patent Number: 5,345,324
[45] Date of Patent: Sep. 6, 1994

[54] ACTIVE MATRIX LIQUID CRYSTAL DISPLAY DEVICE HAVING TWO LIGHT SHIELDING LAYERS

[75] Inventors: Toshihiko Koseki, Yokohama; Tetsuya Fukunaga, Gifu; Hideo Takano, Atsugi; Hidemine Yamanaka, Yamato, all of Japan

[73] Assignee: International Business Machines Corporation, Armonk, N.Y.

[21] Appl. No.: 49,784

[22] Filed: Apr. 19, 1993

[30] Foreign Application Priority Data

Apr. 22, 1992 [JP] Japan .................................. 4-103144

[51] Int. Cl.$^5$ .......................... G02F 1/136; G02F 1/133
[52] U.S. Cl. ......................................... 359/67; 359/59; 359/75
[58] Field of Search ....................... 359/59, 67, 75, 76, 359/87

[56] References Cited

U.S. PATENT DOCUMENTS

| | | | |
|---|---|---|---|
| 4,759,610 | 7/1988 | Yanagisawa | 359/67 |
| 5,121,237 | 6/1992 | Ikeda et al. | 359/67 |
| 5,245,452 | 9/1993 | Nakamura et al. | 359/59 |
| 5,282,068 | 1/1994 | Inaba | 359/67 |

OTHER PUBLICATIONS

Tsumura et al "High-Resolution 10.3-in. Diagonal Multicolor TFT-LCD" SID 91 Digest-1991-pp. 215–218.

*Primary Examiner*—William L. Sikes
*Assistant Examiner*—Tai Van Duong
*Attorney, Agent, or Firm*—David Aker

[57] ABSTRACT

In a liquid crystal display device including a first transparent insulating substrate having a common electode formed theron; a second transparent insulating substrate having gate lines formed in a first direction; data lines formed in a second direction so as to intersect said gate lines, liquid crystal display cells, each at a crosspoint of said gate and data lines; the cells having a thin film transistor and a display electrode; a light shielding layer having an aperture for exposing a display area of each display electrode; a liquid crystal material retained between said first and second substrates, and a liquid crystal orientating layer on at least one of the substrates, the improvement comprising, the light shielding layer at an edge of said aperture being located in an up stream direction with respect to a rubbing direction of the orientating layer of the substrate, comprising a thin light shielding layer formed at a periphery of the display electrode for defining an edge of the aperture, and a thick light shielding layer having an edge positioned on the thin light shielding layer.

8 Claims, 6 Drawing Sheets

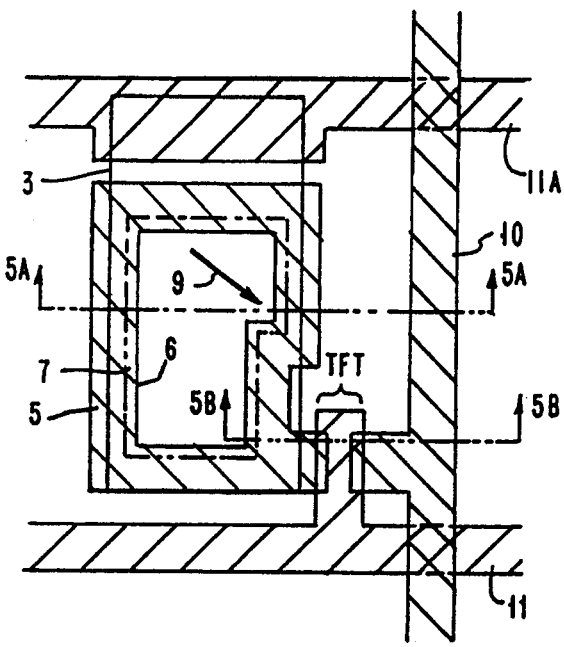
FIG. 5A
CROSS SECTION 5A-5A
FIG. 5B STEP 1
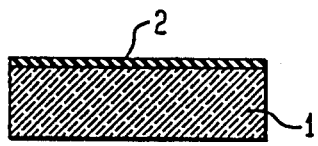
FIG. 5D STEP 2
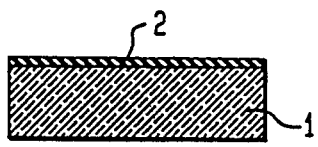
FIG. 5F STEP 3
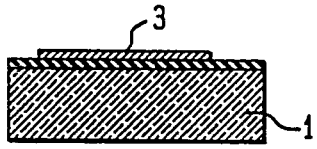
FIG. 5H STEP 4
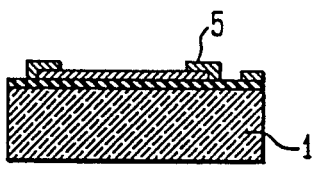
FIG. 5J STEP 5
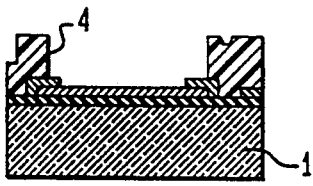
FIG. 5L STEP 6
CROSS SECTION 5B-5B
FIG. 5C STEP 1
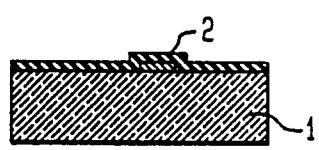
FIG. 5E STEP 2
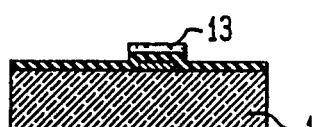
FIG. 5G STEP 3
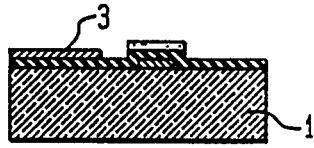
FIG. 5I STEP 4
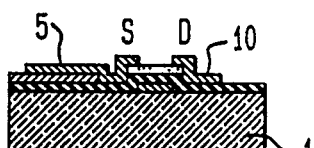
FIG. 5K STEP 5
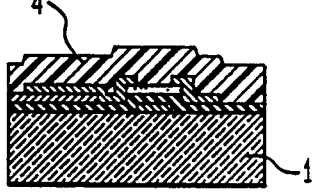
FIG. 5M STEP 6

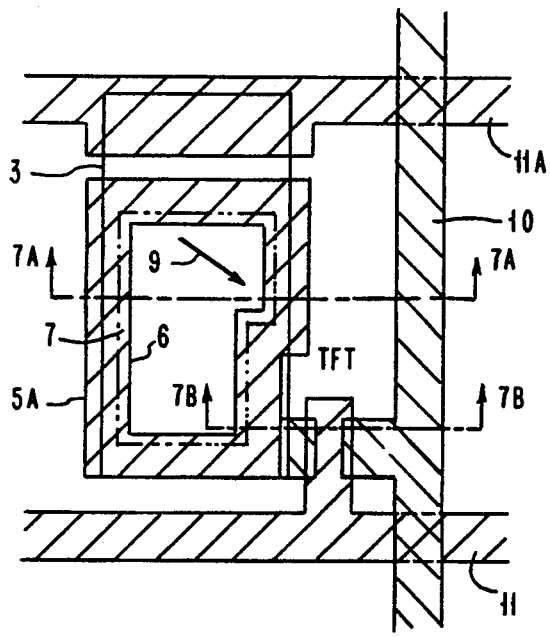
FIG. 7A
CROSS SECTION 7A-7A | CROSS SECTION 7B-7B
FIG. 7B STEP 1
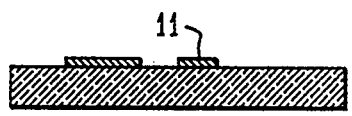
FIG. 7C STEP 1
FIG. 7D STEP 2
FIG. 7E STEP 2
FIG. 7F STEP 3
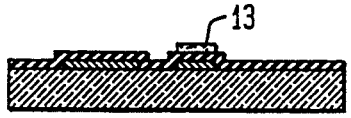
FIG. 7G STEP 3
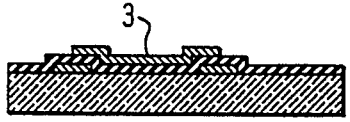
FIG. 7H STEP 4
FIG. 7I STEP 4
FIG. 7J STEP 5
FIG. 7K STEP 5
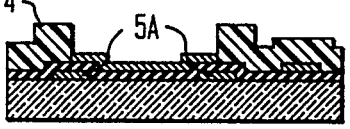
FIG. 7L STEP 6
FIG. 7M STEP 6

ACTIVE MATRIX LIQUID CRYSTAL DISPLAY DEVICE HAVING TWO LIGHT SHIELDING LAYERS

BACKGROUND OF THE INVENTION

1. Field of the Invention

This invention relates to a liquid crystal display (LCD) device, wherein a light shielding layer is formed on thin film transistors.

2. Background Art

A light shielding layer known as a black matrix has been provided in LCD devices. The pattern of the light shielding layer is designed so as to expose only the display area of display electrodes to improve contrast of displayed images.

The LCD device has first and second transparent insulating substrates, such as glass, spaced from each other, and liquid crystal material contained in the space. In a typical thin film transistor (TFT) type LCD device, the light shielding layer having a pattern for exposing only the display areas is formed on the first substrate, then a common electrode of Indium Tin Oxide (ITO) is formed, and an orientating layer, such as polyimide, is formed. A thin metal layer, such as Cr, can be used as the light shielding layer since the entire common electrode is maintained at a fixed reference potential.

On the second substrate, horizontal metal gate lines and vertical metal data lines are formed. At each crosspoint of the gate and data lines, a display cell is formed which includes a TFT and the display electrode of ITO. In addition, a passivation layer and an orientating layer are formed on the structure. Polarizers are arranged outside the first and second substrates, and a light source is provided to project the light to the LCD device. A data line driver and a gate line driver connected to the data and gate lines, respectively are selectively activated to apply a voltage to the liquid crystal between selected display electrodes and the common electrode in order to display an image. Since the light shielding layer is formed on the first substrate, known as the common electrode substrate, and the display electrodes are formed on the second substrate, known as the TFT substrate, both substrates must be carefully assembled to align apertures of the light shielding layer with the display electrodes.

To solve this alignment problem, it has been proposed that the light shielding layer be formed on the TFT substrate, but, this would cause another problem. Specifically, the metal light shielding layer cannot be used on the TFT substrate because the presence of the metal light shielding layer causes an undesirable capacitance effect across the insulating layer (such as the passivation layer), and the conductive elements (such as the data and gate lines).

To solve the problem, the inventors of the present invention have tried to use a photopolymer (i.e. photoresist material) as the light shielding layer on the TFT substrate. To realize an optical density which is required to sufficiently shield or block the light, a thick photoresist layer is required. FIG. 1 shows a plan view of the cell and FIG. 2 shows the cross-sectional structure of the second glass substrate GS viewed along line 2—2 of FIG. 1. The first glass substrate is not shown in FIG. 2. The gate line or gate electrode GE is formed on the second glass substrate. A gate insulating layer GI is formed, an amorphous Si layer AS which operates as a channel region of the TFT is formed, and a display electrode DE of ITO is formed. An N+ amorphous Si layer SL and an aluminum layer AL are formed on the amorphous Si layer to form a drain electrode at the right side of the channel of the TFT and a source electrode at the left side. The drain region extends from the data line, and the source electrode is connected to the display electrode DE. A passivation layer PL is formed to cover the structure. Next, a thick black photoresist layer or light sheilding layer LS is formed to expose the display electrode. Orientating layer OL is formed on the entire structure. The orienting layer is rubbed in one direction, as shown in FIG. 1, to align liquid crystal molecules in one direction when no voltage is applied, as is well known in the art. It is required that the liquid crystal molecules tilt in the same direction, as shown by the liquid crystal molecules B. However, the liquid crystal molecules A near the edge of the aperture of the light shielding layer located up stream with respect to the rubbing direction tend to tilt in a reverse direction, as shown in FIG. 2 . This is called reverse tilt. The reverse tilt occurs due to the large step H, which is caused by the thick photoresist layer.

FIG. 3 shows a simplified structure of the aperture of FIG. 2, without the passivation layer and the orientating layer. The reverse tilt occurs in an area defined by L located up stream with respect to the rubbing direction. A boundary between the normal tilt region and the reverse tilt region forms a kind of disclination line, and is called a reverse tilt disclination line. The light from the light source passes through the liquid crystal along the reverse tilt disclination line. A line L shown in FIG. 1 shows the continuous reverse tilt disclination line appearing along the upper side edge and the left side edge of the aperture (located at the up stream position with respect to the rubbing direction when no voltage is applied across the liquid crystal).

The reverse tilt disclination line raises a problem when the LDC device is operated in a normally white mode. In the normally white mode, the polarizers are crossed and the liquid crystal molecules are twisted. When no voltage is applied across the liquid crystal, the light from the light source passes through the LCD device, whereby the white color is displayed. When a voltage is applied, the light is blocked by the polarizers, and the black color is displayed. However, if reverse tilt occurs when the voltage is applied, the light from the light source passes through the reverse tilt disclination line, so that a white line appears in the black image, whereby it degrades contrast and increases an afterimage or residual image effect. In this manner, the display quality is remarkably degraded by the reverse tilt.

Japanese patent application 63-162521 (Published Unexamined Patent Application 02-13927) solves the problem of the reverse tilt occurring at corner portions of a rectangular display electrode of the LCD device by enlarging the corner portions of the display electrode, whereby the reverse tilt occurs in the enlarged areas of the display electrode. Thus, patent application 63-162521 shows an approach which is very different from the present invention for solving the reverse tilt problem.

SUMMARY OF THE INVENTION

It is an object of the invention to solve the problem of reverse tilt, which is caused by the use of a thick light shielding layer on the TFT substrate.

In accordance with the invention a liquid crystal display device includes a first transparent insulating substrate having a common electrode formed thereon, a second transparent insulating substrate having gate lines formed in a first direction, data lines formed in a second direction intersecting the first direction, a liquid crystal display cell at each intersection of the gate and data lines, each cell including a thin film transistor, a display electrode, a light shielding layer having an aperture for exposing a display area of each display electrode, and liquid crystal material retained between tile first and second substrates. The light shielding layer, at an up stream position along a rubbing direction, comprises a thin light shielding layer formed at the periphery of the display electrode for defining an edge of the aperture, and a thick light shielding layer having an edge positioned on the thin light shielding layer.

The thin light shielding layer blocks light passing through reverse tilted liquid crystal molecules. The thickness of the thin light shielding layer is preferably equal to or less than 0.5 um. The thin light shielding layer is preferably a metal layer and the thick light shielding layer is a black photoresist layer. The metal layer may be the metal layer used for the gate line, or the metal layer used for the data line. The photoresist layer may include blue pigments, yellow pigments and violet pigments. The photoresist layer may also include red pigments, blue pigments, yellow pigments and violet pigments.

BRIEF DESCRIPTION OF THE DRAWINGS

FIG. 5A to FIG. 5M illustrate a first embodiment of the invention.

FIG. 7A to FIG. 7M illustrate a second embodiment of the invention.

DETAILED DESCRIPTION OF THE PREFERRED EMBODIMENTS

A liquid crystal display device includes a first transparent insulating substrate, such as a glass plate, a second transparent insulating substrate, such as a glass plate, and liquid crystal material having a positive dielectric anisotropy retained between the first and second substrates. The first substrate has a common electrode and an orientating layer. The second substrate has gate lines extending in a horizontal direction, data lines extending in a vertical direction and a liquid crystal display cell formed at each crosspoint or intersection of the gate and data lines. The liquid crystal display cell includes a thin film transistor and a display electrode. An exposed area, defined by the aperture of the display electrode is defined as a picture element (pel). The surface of the structure of the second substrate is coated by an orientating layer. The orientating layer of the first substrate is rubbed in a first direction and the orientating layer of the second substrate is rubbed in a second direction intersecting the first direction, whereby the liquid crystal molecules are twisted by 90 degrees.

The details of the structure of the first substrate are not described and not shown, as they are well known in the art.

Figure 4:
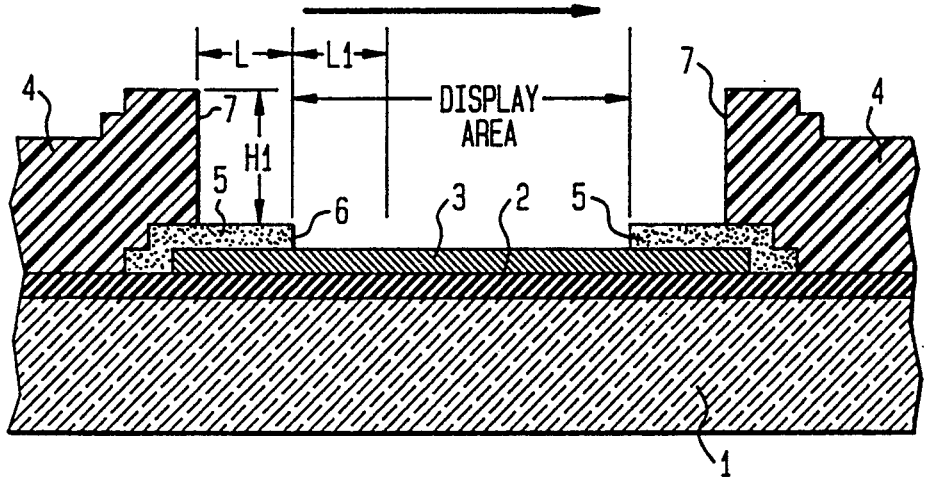
FIG. 4 illustrates the structure of the display electrode and the thin and thick light shielding layers of the invention.

FIG. 4 shows a simplified structure of the display electrode on the second glass substrate 1. The gate insulating layer 2, the display electrode (ITO) 3, a thin light shielding layer 5 and a thick black photoresist layer 4, i.e. the thick light shielding layer, are formed on the glass substrate 1.

In accordance with the present invention, the thin light shielding layer 5 and the thick black photoresist layer 4 are formed at a periphery of the display electrode 3, which is positioned up stream with respect to the direction of rubbing of an orientating layer. Due to a height H1 from the surface of the thin light shielding layer 5 to the top of the thick black photoresist layer 4, reverse tilt occurs in a portion represented by L. The distance L is typically 5-10 um. The purpose of the thin light shielding layer 5 is to prevent the light from passing through the reverse tilted liquid crystal molecules in the portion L. However, if the thickness of the light shielding layer 5 is large, reverse tilt occurs in a portion L1. The inventors of the present invention have found that reverse tilt does not occur in the portion L1 if the thickness of the light shielding layer 5 is equal to or less than 0.5 um, and that the material satisfying the above two conditions, i.e. the light blocking capability and the thickness equal to or less than 0.5 um, exists in the LCD device as the gate line or the data line. Examples of the thickness of the gate and data lines are 3000A and 4500A, respectively. The use of the metal material for the gate and data lines as the thin light shielding layer 5 has an important advantage in that the thin light shielding layer 5 can be formed simultaneously with the formation of the gate or data lines. In other words, the thin light shielding layer 5 can be formed without increasing the number of fabricating steps for the LCD device.

For the reasons described above, the light shielding layer for the edge of the display area, located up stream with respect to the rubbing direction, comprises the thin light shielding layer 5 formed at the periphery of the display electrode 3 for defining the edge 6 of the aperture, and the thick black photoresist layer or thick black photopolymer 4, the edge 7 of which is positioned on the thin light shielding layer 5. The edge 6 and the edge 7 are separated from each other by the distance L.

In order to solve the reverse tilt problem, the thin light shielding layer 5 must be formed at the edge of the aperture located up stream with respect to the rubbing direction. However, it is preferable to form the thin light shielding layer 5 at the edges located down stream with respect to the rubbing direction, as shown in FIG. 4, since it is desirable for all the liquid crystal display cells to have the same aperture ratio. The aperture ratio is defined as the ratio of an area through which light passes, to the total area of the liquid crystal display cell.

Although the thin light shielding layer 5 is formed on the display electrode 3 in FIG. 4, layer 5 is also formed below the display electrode 3, as described with respect to FIG. 7A to FIG. 7I and FIG. 8 to FIG. 10.

FIG. 5A to FIG. 5M show a first embodiment of the present invention in which the thin light shielding layer 5 is a part of the metal layer used for the data line.

The plan view of FIG. 5A shows a display cell at a crosspoint of the data line and the gate line. The right-side up hatching lines represent the metal layer used for the gate line, and the left-side up hatching lines represent the metal line used for the data line. The display cell includes a TFT and a transparent display electrode 3, such as ITO. The aperture of the display electrode 3 is defined by the light shielding layer 5 of the data line 10. The arrow 9 indicates the rubbing direction. FIG. 5B to FIG. 5M show cross sections viewed along lines 5A—5A and 5B—5B for each fabricating step.

In step 1 (FIG. 5B and FIG. 5C), a metal layer 11, such as Al, Ti, Cu, Mo, Cr, Ta etc., is deposited on the glass substrate 1 by a sputtering process. The gate line 11 and a reference voltage line 11A, shown in the plan view (FIG. 5A) are formed by a usual selective etching process using a photoresist.

In step 2, (FIG. 5D and FIG. 5E), a transparent insulating layer 2, such as SiOx or SiNx, is deposited on the entire surface of the structure by a chemical vapor deposition (CVD) process.

In step 3 (FIG. 5F and FIG. 5G), an intrinsic amorphous Si layer is deposited on the structure by the CVD process, and is selectively etched to form an active or channel region 13 of the TFT.

In step 4 (FIG. 5H and FIG. 5I), a transparent conductive layer, such as Indium Tin Oxide (ITO), is deposited on the structure, and is selectively etched to form the display electrode 3.

In step 5 (FIG. 5J and FIG. 5K), a metal layer 5, such as Al, Ti, Cu, Mo, Cr, Ta etc., is deposited on the structure, and is selectively etched to form the thin light shielding layer 5, the data line 10, source electrode S and a drain electrode D of the TFT.

In step 6 (FIG. 5L and FIG. 5M), the black photoresist layer 4 of low transmittance is deposited on the structure by a spin coating technology, and is selectively etched to form the structure shown in FIG. 4. The black photoresist layer 4 is a negative photoresist wherein a portion exposed to a light source is not dissolved by a developing agent and a portion which is not exposed to a light source is dissolved by the developing agent.

Figure 6:
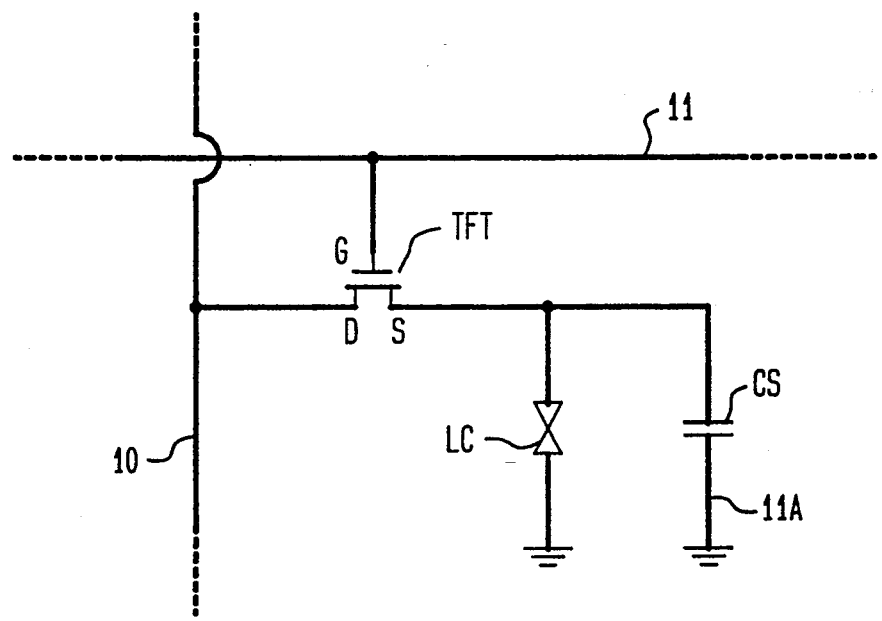
FIG. 6 illustrates the circuit of the liquid crystal display cell.

FIG. 6 shows an equivalent circuit for tile liquid crystal cell shown in the FIG. 5A, as is known in the art. A portion of the display electrode which overlaps with the reference voltage line 11A, the insulating layer 12 and the reference voltage line 11A in FIG. 5A form a storage capacitor CS in FIG. 6. The storage capacitor CS stores electric charges during one frame period of the LCD device, as is well known in the art.

FIG. 7A to FIG. 7M show a second embodiment of the present invention in which the thin light shielding layer 5 is formed by the metal material used for the gate line.

FIG. 7A shows the display cell at the crosspoint of the data line 10 and the gate line 11. The equivalent circuit of the cell is shown in FIG. 6. FIG. 7B to FIG. 7I show cross-sections viewed along lines 7A—7A and 7B—7B, respectively, in each fabricating step. The arrow 9 shows the rubbing direction.

In step 1 (FIG. 7B and FIG. 7C), the metal layer is deposited on the entire surface of the glass substrate 1, and is selectively etched to form the gate line 11, the reference voltage line 11A and the thin light shielding layers 5A.

In step 2 (FIG. 7D and FIG. 7E), the transparent insulating layer 2 is deposited on the structure.

In step 3 (FIG. 7F and FIG. 7G), the intrinsic amorphous Si active region 13 of the TFT is formed.

In step 4 (FIG. 7H and FIG. 7I), the transparent display electrode 3, such as ITO, is formed on the structure.

In step 5 (FIG. 7J and FIG. 7K), the metal data line 10, the drain electrode D and the source electrode S of the TFT are formed.

In step 6 (FIG. 7L and FIG. 7M), the thick black photoresist layer 4 of low transmittance is formed to expose the display area of the display electrode 3.

Figure 8:
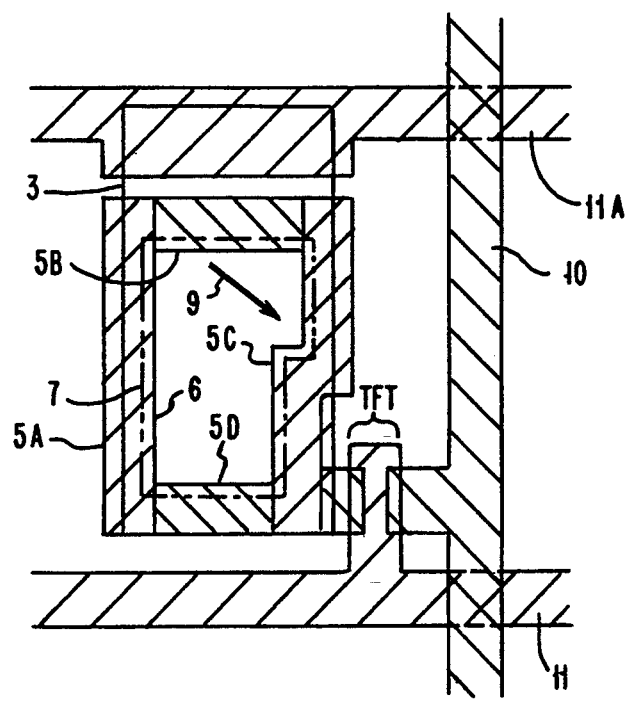
FIG. 8 illustrates a third embodiment of the invention.

FIG. 8 shows a third embodiment of the present invention, wherein the thin light shielding layer 5 at the edge of the aperture is formed by four portions, i.e. portions 5A, 5B, 5C and 5D. The portions 5A and 5C are formed by the metal of the gate line 11, and the portions 5B and 5D are formed by the metal of the data line 10. The arrow 9 shows the rubbing direction.

Figure 9:
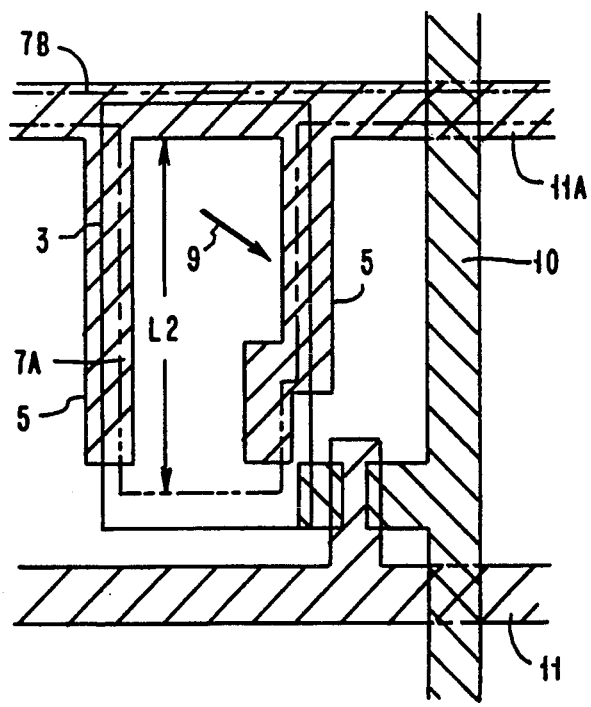
FIG. 9 illustrates a fourth embodiment of the invention.

FIG. 9 shows a fourth embodiment of the present invention, wherein the reference voltage line 11A is commonly used as the upper horizontal portion of the thin light shielding layer 5, and the left and right vertical portions of the thin light shielding layer 5 are extensions of the upper horizontal portion. The reference voltage line 11A is simultaneously formed with the gate line 11. In other words, the reference voltage line 11A, i.e. the thin light shielding layer 5, is made of the metal of the gate line 11. As described hereinbefore with refer to the FIGS. 5A to 5M and to FIG. 6, the reference voltage line 11A which overlaps with the display electrode 3 operates as one electrode of the storage capacitor CS. In the embodiments shown in the FIG. 5A to FIG. 5M, FIG. 7A to FIG. 7I, FIG. 8 and FIG. 10 (described below), the width of the portion of the reference voltage line 11A overlapping with the display electrode 3 is wider than that of the remaining portion.

Figure 1:
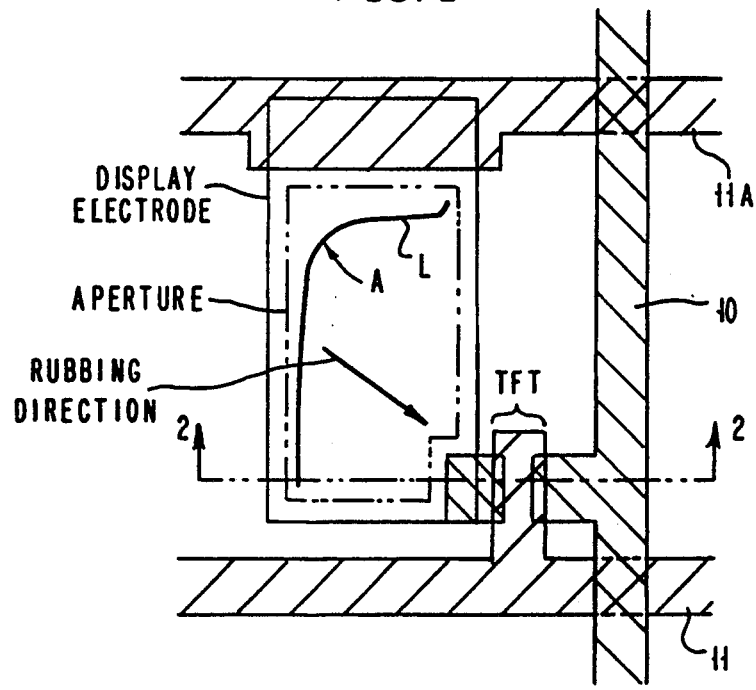
FIG. 1 is a plan view of a liquid crystal display cell, the image of which is degraded by reverse tilt.
Figure 2:
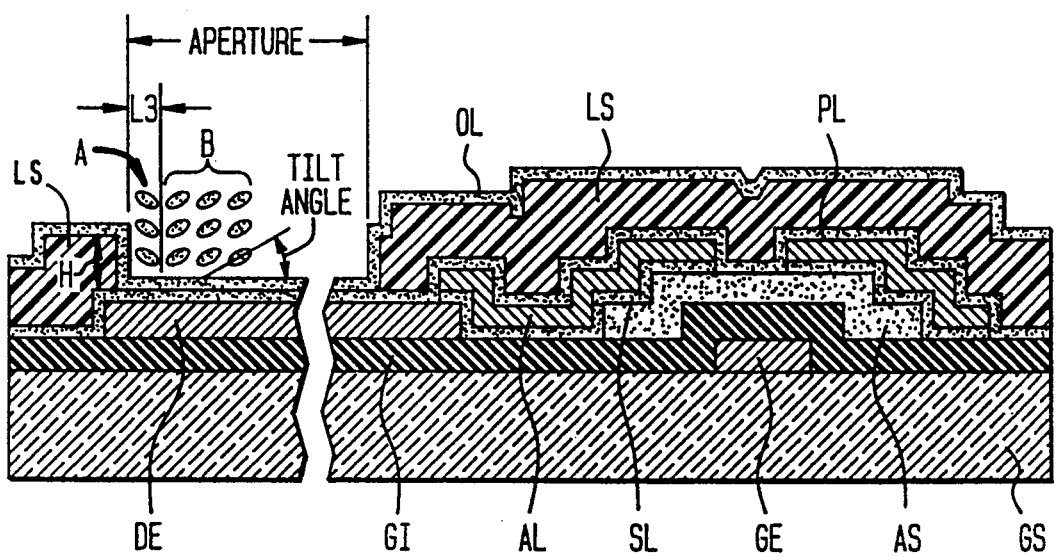
FIG. 2 is a cross-sectional view taken along line 2—2 of FIG. 1.
Figure 3:
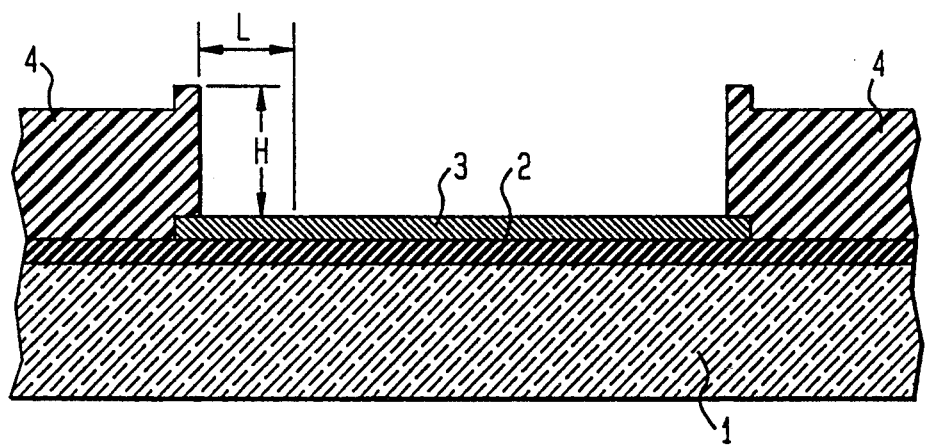
FIG. 3 illustrates the display electrode of the structure shown in FIG. 2.

In the embodiment shown in FIG. 9, the left and right vertical portions of the thin light shielding layer 5 are used as one electrode of the storage capacitor CS, whereby the width of the reference voltage line 11A overlapping the top portion of the display electrode 3 can be reduced. For the above reasons, the length L2 of the aperture, i.e. the display area of the display electrode 3, is longer than that of other embodiments, whereby a large aperture ratio of the display cell is realized. The edge 7A of the thick black photoresist layer 4 is separated or disconnected from the edge 7B of the thick black photoresist layer above the reference line 11A, so that reverse tilt occurring along the vertical edge 7A is separated or disconnected from reverse tilt occurring along the horizontal edge 7B, whereby oblique reverse tilt as shown by portion A in FIG. 1 is completely prevented. The arrow 9 shows the rubbing direction.

Figure 10:
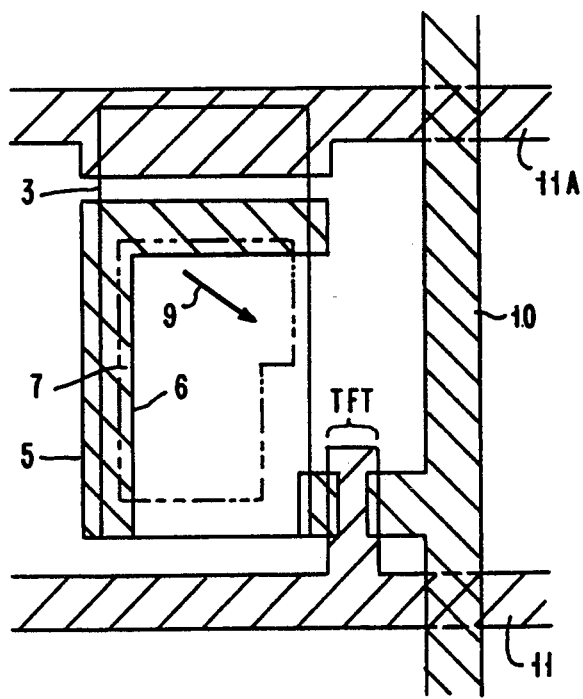
FIG. 10 illustrates a fifth embodiment of the invention.

FIG. 10 shows a fifth embodiment of the present invention, wherein the thin light shielding layer 5 is formed only at the up stream position of the rubbing direction 9. That is, the thin light shielding layer 5 is provided at the top edge and the leftside edge of the aperture of the display electrode 3. The thin light shielding layer 5 is made continuous with the metal of the gate line 10. However, the thin light shielding layer 5 can be also made continuous with the metal of the data line 10.

The negative photoresist layer, i.e. transparent organic material comprises:
Binder polymer: 300 g
monomer: 165 g
initiator: 10 g
inhibitor: 80 mg
solvent: 2750 g The following kinds of pigments are dispersed in the negative transparent photoresist to provide black colored negative photoresist so that it functions as the light shielding layer. The pigments are red pigments, such as dianthraquinone, blue pigments, such as Cu-phthalocyanine, yellow pigments, such as isoindolin, and violet pigments, such as dioxazine. These pigments are mixed to provide the black colored negative photoresist.

The combinations of the pigments to provide the black color are, as follows.

|                | Example 1 | Example 2 |
|----------------|-----------|-----------|
| Red pigments   | 5 w %     | —         |
| Blue pigments  | 35 w %    | 20 w %    |
| Yellow pigments| 40 w %    | 20 w %    |
| Violet pigments| 20 w %    | 60 w %    |

The pigments are dispersed into the negative photoresist to provide the black colored light shielding layer which indicates an optical density equal to or larger than 1.5.

The optical density is determined by the thickness of the layer and the weight % of the pigments dispersed in the layer. The light shielding layer 4 used in the embodiments described hereinbefore has a thickness of 2 um, and a weight % of the pigments dispersed in the layer 4 is 36 weight %, to provide an optical density of 2.0.

It has been found by the inventors of the present invention that the value of 1.5 for the optical density is the minimum value required to provide the required contrast in the displayed image. If the optical density is smaller than 1.5, the light passes to the thin film transistor through the layer 4, so that the voltage-transmittance characteristic of the liquid crystal display cell is shifted and the display quality is degraded.

The combinations of the thickness of the light shielding layer 4 and the weight % of the pigments dispersed in the layer 4 to provide the optical density of 1.5 are, as follows.

| Thickness (um) | Weight % | Optical density |
|----------------|----------|-----------------|
| 0.8            | 67.5     | 1.5             |
| 0.9            | 60.0     | 1.5             |
| 1.0            | 54.0     | 1.5             |
| 1.1            | 49.0     | 1.5             |
| 1.5            | 36.0     | 1.5             |

-continued

| Thickness (um) | Weight % | Optical density |
|----------------|----------|-----------------|
| 2.0            | 27.0     | 1.5             |
| 2.5            | 21.6     | 1.5             |

Thus the present invention improves the quality of a displayed image which would otherwise be degraded by reverse tilt. It does so without increasing the number of processing steps needed to form a TFT/LCD and therefore does so without significantly increasing cost.

What is claimed is:

1. In a liquid crystal display device including a first transparent insulating substrate having a common electrode formed thereon, a second transparent insulating substrate having gate lines formed in a first direction, data lines formed in a second direction so as to intersect said gate lines, liquid crystal display cells each formed at a crosspoint of said gate and data lines, said cell having a thin film transistor and a display electrode; and a light shielding layer having an aperture for exposing a display area of each display electrode; liquid crystal material retained between said first and second substrates, and a liquid crystal orientating layer on at least one of said substrates the improvement comprising:
said light shielding layer at an edge of said aperture being located in an up stream direction with respect to a rubbing direction of said orientating layer of said substrate, comprising a thin light shielding layer formed at a periphery of said display electrode for defining an edge of said aperture, and a thick light shielding layer having an edge positioned on said thin light shielding layer.

2. A liquid crystal display device according to claim 1, wherein said thin light shielding layer blocks light passing through reverse tilted liquid crystal molecules.

3. A liquid crystal display according to claim 2, wherein a thickness of said thin light shielding layer is equal to or less than 0.5 um.

4. A liquid crystal display device according to claim 1, wherein said thin light shielding layer is a metal layer and said thick light shielding layer is a black colored photoresist layer.

5. A liquid crystal display device according to claim 4, wherein said metal layer is an extension of a metal layer used for said gate line.

6. A liquid crystal display device according to claim 4, wherein said metal layer is an extension of a metal layer used for said data line.

7. A liquid crystal display device according to claim 4, wherein said photoresist layer includes blue pigments, yellow pigments and violet pigments.

8. A liquid crystal display device according to claim 4, wherein said photoresist layer including red pigments, blue pigments, yellow pigments and violet pigments.

* * * * *